(12) United States Patent
Wurtenberger et al.

(10) Patent No.: US 9,504,021 B1
(45) Date of Patent: Nov. 22, 2016

(54) LONG TERM EVOLUTION (LTE) NETWORK CONTROL OF CARRIER AGGREGATION FOR USER EQUIPMENT

(71) Applicant: Sprint Communications Company L.P., Overland Park, KS (US)

(72) Inventors: Andrew Mark Wurtenberger, Olathe, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/705,512

(22) Filed: May 6, 2015

(51) Int. Cl.
*H04W 4/00* (2009.01)
*H04W 72/04* (2009.01)
*H04L 29/06* (2006.01)
*H04W 28/02* (2009.01)

(52) U.S. Cl.
CPC ...... *H04W 72/0406* (2013.01); *H04L 65/1006* (2013.01); *H04W 28/0268* (2013.01)

(58) Field of Classification Search
None
See application file for complete search history.

(56) References Cited

U.S. PATENT DOCUMENTS

| 2009/0257387 A1 | 10/2009 | Gholmieh et al. | |
| 2011/0170420 A1 | 7/2011 | Xi et al. | |
| 2012/0307751 A1* | 12/2012 | Dinan | H04L 5/0007 370/329 |
| 2013/0201834 A1* | 8/2013 | Klingenbrunn | H04W 28/12 370/236 |
| 2013/0331077 A1 | 12/2013 | Mucke et al. | |
| 2014/0233616 A1* | 8/2014 | Belghoul | H04M 11/06 375/222 |
| 2015/0250016 A1* | 9/2015 | Kotecha | H04W 76/064 370/329 |

FOREIGN PATENT DOCUMENTS

| EP | 2257113 | 12/2010 |
| EP | 2398285 | 12/2011 |
| WO | 2012162889 | 12/2012 |
| WO | 2013116040 | 8/2013 |
| WO | 2014054341 | 4/2014 |

* cited by examiner

*Primary Examiner* — Edan Orgad
*Assistant Examiner* — Rebecca Song

(57) ABSTRACT

A Long Term Evolution (LTE) communication network wirelessly exchanges first data with LTE User Equipment (UE) using LTE Carrier Aggregation (CA) to support at least an LTE Quality-of-Service Class Identifier 5 (QCI 5) data bearer. The LTE communication network detects if the LTE UE accepts an LTE QCI 1 data bearer while the LTE CA and the LTE QCI 5 data bearer are active. In response, LTE communication network disables the LTE CA for the LTE UE. LTE communication network wirelessly exchanges second data with the LTE UE over the LTE QCI 1 data bearer without using the LTE CA in response to disablement.

16 Claims, 6 Drawing Sheets

LONG TERM EVOLUTION (LTE) NETWORK CONTROL OF CARRIER AGGREGATION FOR USER EQUIPMENT

TECHNICAL BACKGROUND

Wireless communication systems provide a user device wireless access to communication services. Wireless communication systems allow users to move about and communicate over the air with access communication networks. Wireless communication devices, such as smartphones, tablet computers, and other media devices exchange data packets with data communication networks to provide data communication services, such as internet access, media streaming, voice calls, and text messaging.

Long Term Evolution (LTE) is a popular wireless data technology. Using LTE, User Equipment (UE) detects an evolved NodeB (eNodeB) base station and responsively exchanges Radio Resource Configuration (RRC) signaling with the eNodeB. The eNodeB then transfers an S1-Application Protocol (S1-AP) message to a Mobility Management Entity (MME). The MME transfers a Diameter request message to a Home Subscriber System (HSS) and in response, receives a Diameter response from the HSS indicating the Access Point Name (APN) and associated APN information like a Packet Data Network Gateway (P-GW) identifier, Packet Data Network (PDN) type, default Quality-of-Service (QoS) Class Identifier (QCI), and default Aggregate Maximum Bit Rate (AMBR).

The MME then transfers a create session request to a Serving Gateway (S-GW), which in turn transfers a create session request to the P-GW. In response, the P-GW transfers a Diameter request to a Policy Charging Rules Function (PCRF) indicating the APN, default QCI, and default AMBR, and the PCRF applies QoS and accounting rules for the UE. The UE, eNodeB, and MME then exchange additional messaging to set context and the MME then transfers modify bearer signaling to the S-GW, which in turn transfers the modify bearer signaling to the P-GW. The UE may then exchange user data over the eNodeB, S-GW, and P-GW.

Session Initiation Protocol (SIP) is a popular form of signaling to control the exchange of Internet Protocol (IP) packets between communication devices for media streaming and other data transfer services. The communication devices register their IP addresses with the SIP systems over the IP access networks. The SIP control systems resolve names and numbers for the communication devices to their registered IP addresses. The SIP control systems use the registered IP addresses to exchange SIP messaging for the IP communications sessions. The end-user devices then exchange IP packets over the IP access networks and their communication interfaces. IP Multimedia Subsystems (IMSs) are exemplary SIP control systems.

In some examples, a wireless communication system may employ Carrier Aggregation (CA). CA allows LTE networks to allocate multiple resource blocks in channel timeslots simultaneously to a UE. This increases the bandwidth for the UE to signal, and thereby increases the amount of data that can be transferred over a period of time. However, CA also increases overhead on the uplink for the UE since the UE will be receiving more signal interference due to the increased bandwidth. CA can also cause inefficiencies to the network since there is a limited amount of resource blocks each carrier can allocate and if one UE is allocated more resource blocks, there are fewer resource blocks that may be allocated to other UEs.

When implementing communication media sessions and other latency sensitive services, such as voice over LTE (VoLTE) and video over LTE, quality of service should be at an optimum level. However, when CA is enabled in an LTE network, implementing VoLTE and video over LTE services with continuous coverage at the edge of a cell may be difficult due to the increased use of the uplink control channels by the CA enabled UE which impacts service to end users. Unfortunately, typical CA implementation procedures do not take into consideration the UE and LTE network overhead and poor UE service due to increased interference when using CA for latency sensitive services, such as VoLTE and video over LTE.

TECHNICAL OVERVIEW

A Long Term Evolution (LTE) communication network wirelessly exchanges first data with LTE User Equipment (UE) using LTE Carrier Aggregation (CA) to support at least an LTE Quality-of-Service Class Identifier 5 (QCI 5) data bearer. The LTE communication network detects if the LTE UE accepts an LTE QCI 1 data bearer while the LTE CA and the LTE QCI 5 data bearer are active. In response, LTE communication network disables the LTE CA for the LTE UE. LTE communication network wirelessly exchanges second data with the LTE UE over the LTE QCI 1 data bearer without using the LTE CA in response to disablement.

DETAILED DESCRIPTION

Figure 1:
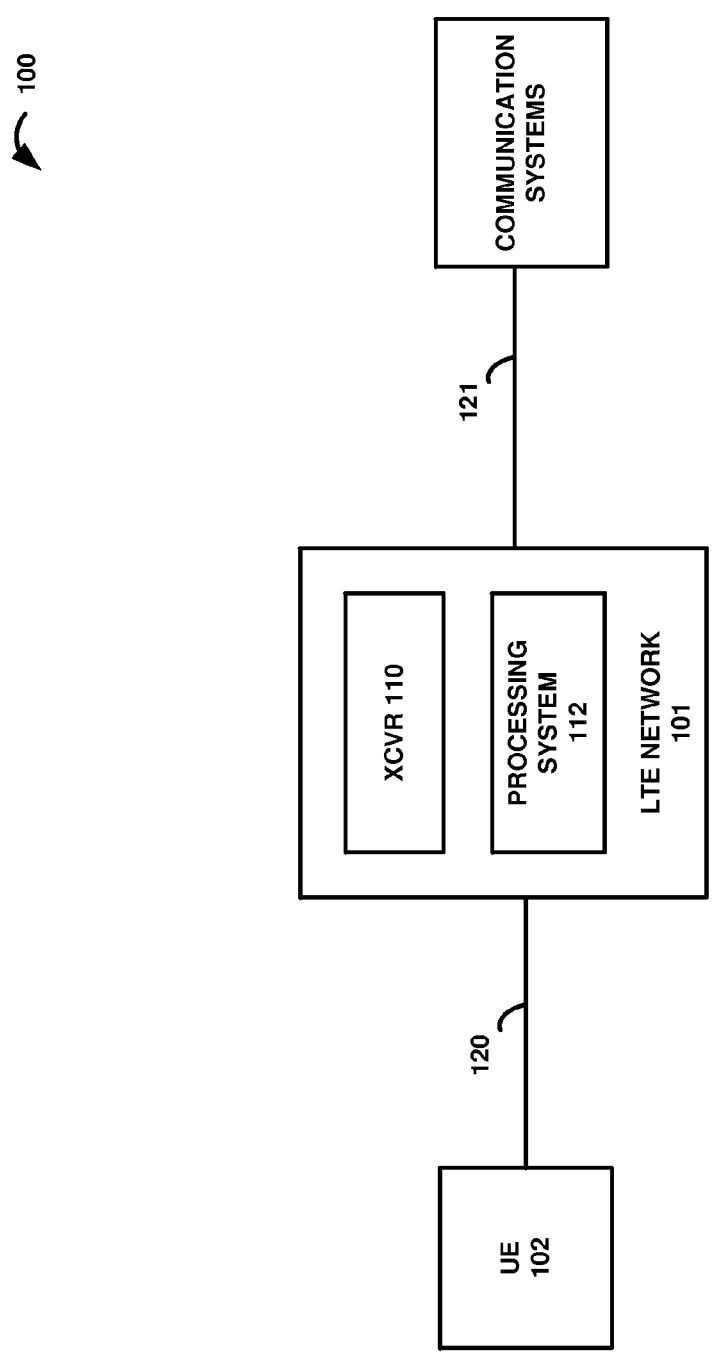
FIGS. 1-3 illustrate a Long Term Evolution (LTE) communication system to control LTE Carrier Aggregation (CA) for User Equipment (UE).
Figure 2:
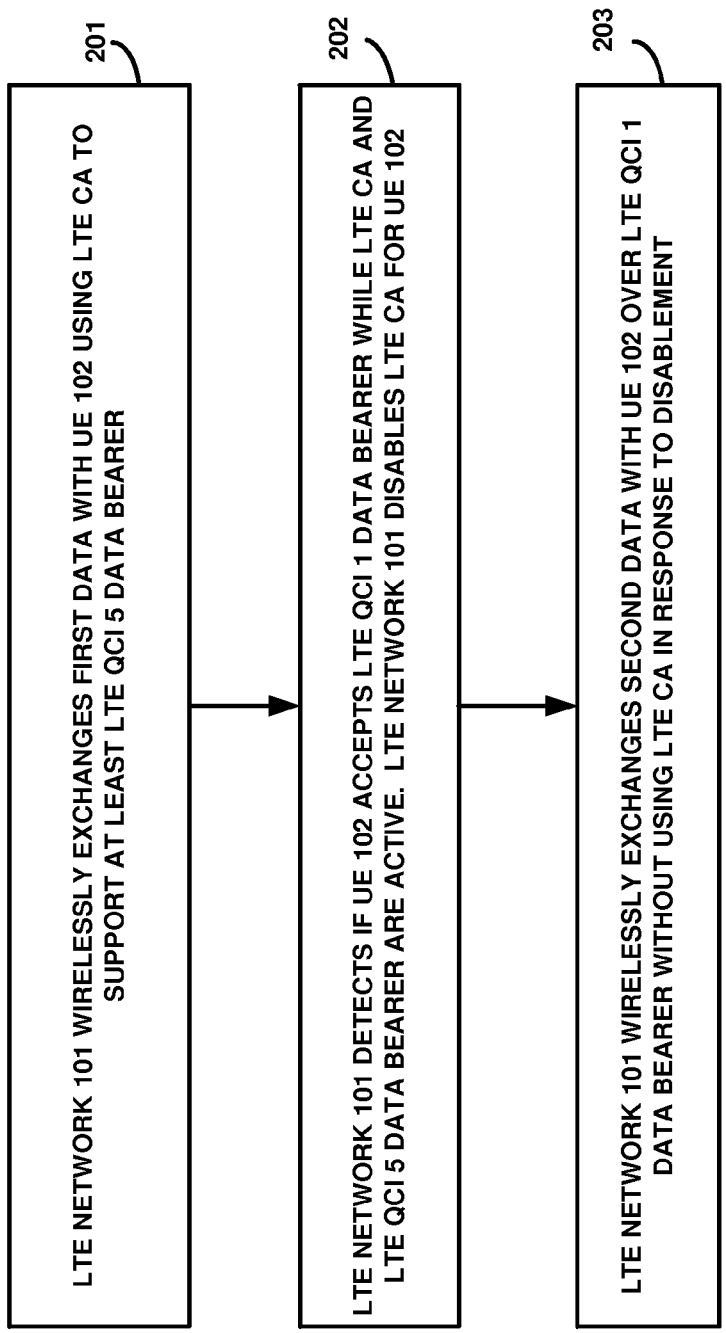
Figure 3:
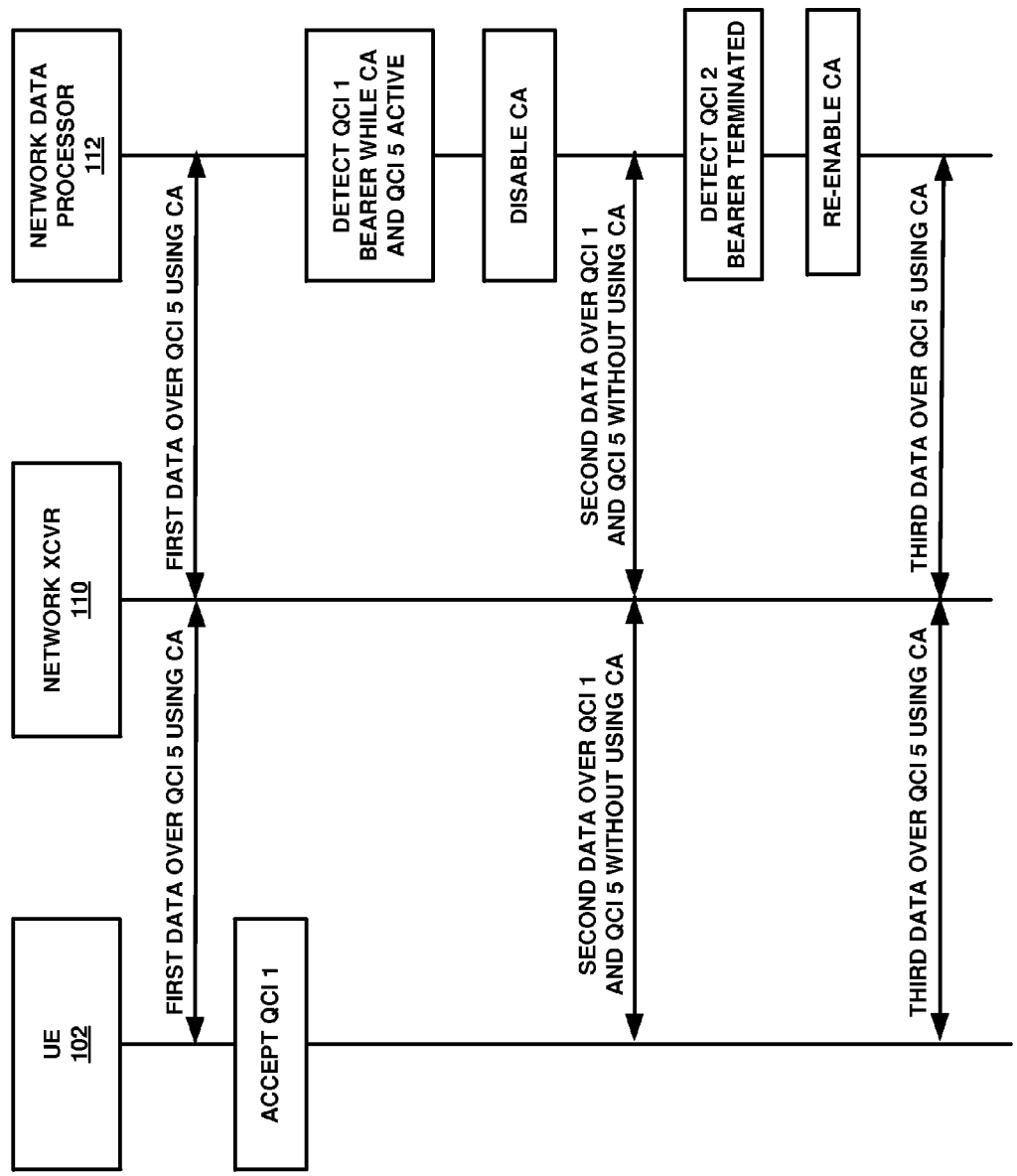

FIGS. 1-3 illustrate Long Term Evolution (LTE) communication system 100 to control LTE Carrier Aggregation (CA) for User Equipment (UE). LTE communication system 100 comprises LTE communication network 101, UE 102, communication links 120-121, and external communication systems. LTE communication network 101 contains wireless transceiver 110 and data processor 112. LTE communication network 101 and UE 102 communicate over wireless link 120. LTE communication network 101 and external communication systems communicate over communication link 121.

LTE communication network 101 transfers data between UE 102 and external communication systems, such as Internet, virtual networks, and other external systems. LTE communication network 101 comprises network elements, such as access nodes, management nodes, gateway systems, server systems, or other data communication network element—including combinations thereof. For example, LTE communication network may comprise an evolved-NodeB (eNodeB), a Mobility Management Entity (MME), a Home Subscriber System (HSS), a Serving Gateway (S-GW), and a Packet Data Network Gateway (P-GW). LTE communication network 101 may also include other components such as a router, server, data storage system, and power supply. LTE communication system 101 may reside in a single device or may be distributed across multiple devices.

UE 102 includes communication transceivers, such as antennas, ports, interfaces, processing circuitry, and memory. UE 102 may be a telephone, computer, e-book, mobile Internet appliance, wireless network interface card, media player, game console, or some other wireless communication apparatus—including combinations thereof.

In operation, LTE communication network 101 wirelessly exchanges first data with UE 102 using LTE CA to support at least an LTE Quality-of-Service (QoS) Class Identifier 5 (QCI 5) data bearer. Each QCI is associated with characteristics pertaining to the treatment of packet forwarding for the traffic type, such as scheduling priority, packet delay budget, and packet error loss rate. A QCI 5 data bearer is an LTE QoS class identifier typically used for Internet Protocol (IP) Multimedia Session (IMS) signaling.

LTE CA allows LTE communication network 101 to provide UE 102 with a greater amount of data over a shorter period of time by combining resource blocks in the bandwidth. LTE CA also allows UE 102 to use multiple signaling channels simultaneously. Using LTE CA, an eNodeB scheduler typically schedules the resource blocks in the channel timeslots and alerts UE 102 to open up its bandwidth to receive a larger signaling channel based on the scheduling grants. In particular, LTE communication network 101 may enable LTE CA for UE 102 based on the type of UE, location of UE, IMSI, time of day, QCI, APN, or some other LTE CA related indication.

In a next operation, LTE communication network 101 detects if UE 102 accepts an LTE QCI 1 data bearer while the LTE CA and the LTE QCI 5 data bearer are active. A QCI 1 data bearer is an LTE QoS class identifier typically used for conversational voice call signaling. LTE communication network 101 may detect if UE 102 accepts the LTE QCI 1 data bearer by the eNodeB receiving a Radio Resource Configuration (RRC) signaling message from UE 102 indicating that UE 102 accepted an add bearer request from LTE communication network 101. LTE communication network 101 may also detect if UE 102 has accepted the LTE QCI 1 data bearer by the eNodeB receiving an order from an MME requesting the eNodeB to send an RRC signal message to UE 102 requesting UE 102 to add the bearer.

In response to LTE communication network 101 detecting if UE 102 accepts an LTE QCI 1 data bearer while the LTE CA and the LTE QCI 5 data bearer are active, LTE communication network 101 disables the LTE CA for UE 102. LTE communication network 101 may disable the LTE CA for UE 102 by the eNodeB scheduler in LTE communication network 101 scheduling fewer resource blocks for the channel timeslots and instructing UE 102 to narrow its bandwidth for signaling based on the new scheduling grants. This allows UE 102 to have less signal noise while using the LTE QCI 1 data bearer and the LTE QCI 5 data bearer for the communication media session. Disabling LTE CA after UE 102 has accepted the LTE QCI 1 data bearer also allows LTE communication network 101 to more efficiently distribute signaling resources to other UEs while UE 102 is using the LTE QCI 1 data bearer for the communication media session.

LTE communication network 101 then wirelessly exchanges second data with UE 102 over the LTE QCI 1 data bearer without using the LTE CA in response to the disablement. For example, UE 102 may receive a voice call media session request and add an LTE QCI 1 data bearer while LTE CA and LTE QCI 5 data bearer are active for UE 102. Once the eNodeB in LTE communication network 101 detects the acceptance of the LTE QCI 1 data bearer by UE 102, the eNodeB scheduler in LTE communication network 101 would disable the LTE CA for UE 102 by scheduling less resource blocks for the channel timeslots to provide better coverage and service for the voice call media session. LTE communication network 101 then would wirelessly exchanges data for the voice communication session with UE 102 over the LTE QCI 1 data bearer without using the LTE CA in response to the disablement.

In some examples, LTE communication network 101 detects if the LTE QCI 1 data bearer is terminated, and in response, re-enables the LTE CA for UE 102. LTE communication network 101 may detect if the LTE QCI 1 data bearer is terminated by the eNodeB detecting a loss of use of the LTE QCI 1 data bearer over a predetermined period of time. LTE communication network 101 may also detect if the LTE QCI 1 data bearer is terminated by receiving a communication from the MME that LTE QCI 1 data bearer has been torn down. For example, the eNodeB in LTE communication network 101 may determine that no data has been transmitted to or from UE 102 for several seconds. The eNodeB scheduler of LTE communication network 101 would then determine that the QCI 1 data bearer is terminated and would begin scheduling channel resource blocks for UE 102 and alert UE 102 to open up its bandwidth for receiving signaling.

In a next operation, LTE communication network 101 would then wirelessly exchange third data with UE 102 using the LTE CA in response to the re-enablement. For example, if UE 102 ends the conversational voice call media session and terminates the LTE QCI 1 data bearer, LTE communication network 101 would enable the LTE CA for UE 102 to provide an increased bandwidth and bitrate and allow UE 102 to transmit a greater amount of data over a shorter period of time and UE 102 would wirelessly exchange data with UE 102 using the LTE CA.

In some examples, LTE communication network 101 detects if UE 102 accepts an LTE QCI 2 data bearer while the LTE CA and the LTE QCI 5 data bearer are active, and in response, disables the LTE CA for UE 102. QCI 2 data bearer is an LTE QoS class identifier typically used for conversational video call media sessions. LTE communication network 101 may detect if UE 102 accepts the LTE QCI 2 data bearer by the eNodeB receiving an RRC signaling message from UE 102 indicating that UE 102 accepted an add bearer request from LTE communication network 101, or an order from an MME requesting the eNodeB to send an RRC signal message to UE 102 requesting UE 102 to add the bearer. LTE communication network 101 may disable the LTE CA for UE 102 by the eNodeB scheduler in LTE communication network 101 scheduling fewer resource blocks for the channel timeslots and instructing UE 102 to narrow its bandwidth for signaling based on the new scheduling grants.

In this example, LTE communication network 101 would then wirelessly exchange third data with UE 102 over the LTE QCI 2 data bearer without using the LTE CA in response to the disablement. For example, LTE UE 102 may receive a video call media session request and add an LTE QCI 2 data bearer while LTE CA and LTE QCI 5 data bearer are active for UE 102. Once LTE communication network 101 detects the acceptance of the LTE QCI 2 data bearer by UE 102, LTE communication network 101 would disable the LTE CA for UE 102 to provide better coverage and service for the video call media session and better uplink control channel occupancy for LTE communication system 100. LTE communication network 101 would then wirelessly exchange data for the conversational video call media session with UE 102 over the LTE QCI 2 data bearer and LTE QCI 5 data bearer without using the LTE CA.

In other examples, in response to detecting if UE 102 accepts an LTE QCI 2 data bearer and disabling the LTE CA for UE 102, LTE communication network 101 detects if the LTE QCI 2 data bearer is terminated and re-enables the LTE CA for UE 102, and wirelessly exchanges fourth data with UE 102 using the LTE CA in response to the re-enablement. LTE communication network 101 may detect if the LTE QCI 2 data bearer is terminated by the eNodeB detecting a loss of use of the LTE QCI 2 data bearer over a predetermined period of time or receiving a communication from the MME that LTE QCI 2 data bearer has been torn down.

LTE communication network 101 would re-enable LTE CA by scheduling channel resource blocks for UE 102 and alerting UE 102 to open up its bandwidth for receiving signaling. For example, if UE 102 ends the conversational video call media session and terminates the LTE QCI 2 data bearer, LTE communication network 101 would enable the LTE CA for UE 102 to provide an increased bandwidth and bitrate and allow UE 102 to transmit a greater amount of data over a shorter period of time.

In some examples, LTE communication network 101 detects if UE 102 accepts an LTE QCI 3 data bearer while the LTE CA and the LTE QCI 5 data bearer are active, and in response, disables the LTE CA for UE 102. QCI 3 data bearer is an LTE QoS class identifier typically used for real time gaming media sessions. LTE communication network 101 may detect if UE 102 accepts the LTE QCI 3 data bearer by the eNodeB receiving an RRC signaling message from UE 102 indicating that UE 102 accepted an add bearer request from LTE communication network 101, or by an order from an MME requesting the eNodeB to send an RRC signal message to UE 102 requesting UE 102 to add the bearer. LTE communication network 101 may disable the LTE CA for UE 102 by the eNodeB scheduler in LTE communication network 101 scheduling fewer resource blocks for the channel timeslots and instructing UE 102 to narrow its bandwidth for signaling based on the new scheduling grants.

In this example, LTE communication network 101 would then wirelessly exchange third data with UE 102 over the LTE QCI 3 data bearer without using the LTE CA in response to the disablement. For example, UE 102 may initiate a real time gaming media session and add an LTE QCI 3 data bearer while LTE CA and LTE QCI 5 data bearer are active for UE 102. Once LTE communication network 101 detects the acceptance of the LTE QCI 3 data bearer by UE 102, LTE communication network 101 would disable the LTE CA for UE 102 to provide better coverage and service for the real time gaming media session and better uplink control channel occupancy for LTE communication system 100. LTE communication network 101 would then wirelessly exchange data for the real time gaming media session with UE 102 over the LTE QCI 3 data bearer without using the LTE CA.

In other examples, in response to detecting if UE 102 accepts an LTE QCI 3 data bearer and disabling the LTE CA for UE 102, LTE communication network 101 detects if the LTE QCI 3 data bearer is terminated and re-enables to LTE CA for UE 102, and wirelessly exchanges fourth data with UE 102 using the LTE CA in response to the re-enablement. LTE communication network 101 may detect if the LTE QCI 3 data bearer is terminated by the eNodeB detecting a loss of use of the LTE QCI 3 data bearer over a predetermined period of time or receiving a communication from the MME that LTE QCI 3 data bearer has been torn down.

LTE communication network 101 would re-enable LTE CA by scheduling channel resource blocks for UE 102 and alerting UE 102 to open up its bandwidth for receiving signaling. For example, UE 102 ends the real time gaming media session and terminates the LTE QCI 3 data bearer, LTE communication network 101 would enable the LTE CA for UE 102 to provide an increased bandwidth and bitrate and allow UE 102 to transmit a greater amount of data over a shorter period of time.

In some examples, LTE communication network 101 detects if UE 102 accepts an LTE QCI 4 data bearer while the LTE CA and the LTE QCI 5 data bearer are active, and in response, disables the LTE CA for UE 102. QCI 4 data bearer is an LTE QoS class identifier typically used for non-conversational video media sessions. LTE communication network 101 may detect if UE 102 accepts the LTE QCI 4 data bearer by the eNodeB receiving an RRC signaling message from UE 102 indicating that UE 102 accepted an add bearer request from LTE communication network 101, or an order from an MME requesting the eNodeB to send an RRC signal message to UE 102 requesting UE 102 to add the bearer. LTE communication network 101 may disable the LTE CA for UE 102 by the eNodeB scheduler in LTE communication network 101 scheduling fewer resource blocks for the channel timeslots and instructing UE 102 to narrow its bandwidth for signaling based on the new scheduling grants.

In this example, LTE communication network 101 would then wirelessly exchange third data with UE 102 over the LTE QCI 4 data bearer without using the LTE CA in response to the disablement. For example, UE 102 may initiate a non-conversational video media session and request to add an LTE QCI 4 data bearer while LTE CA and LTE QCI 5 data bearer are active for UE 102. Once LTE communication network 101 detects the acceptance of the LTE QCI 4 data bearer by UE 102, LTE communication network 101 would disable the LTE CA for UE 102 to provide better coverage and service for the non-conversational video media session and better uplink control channel occupancy for LTE communication system 100. LTE communication network 101 would then wirelessly exchange data for the non-conversational video media session with UE 102 over the LTE QCI 4 data bearer without using the LTE CA.

In other examples, in response to detecting if UE 102 accepts an LTE QCI 4 data bearer and disabling the LTE CA for UE 102, LTE communication network 101 detects if the LTE QCI 4 data bearer is terminated and re-enables to LTE CA for UE 102, and wirelessly exchanges fourth data with UE 102 using the LTE CA in response to the re-enablement. LTE communication network 101 may detect if the LTE QCI 4 data bearer is terminated by the eNodeB detecting a loss of use of the LTE QCI 4 data bearer over a predetermined period of time or receiving a communication from the MME that LTE QCI 4 data bearer has been torn down.

LTE communication network 101 would re-enable LTE CA by scheduling channel resource blocks for UE 102 and alerting UE 102 to open up its bandwidth for receiving signaling. For example, UE 102 ends the non-conversational video media session and terminates the LTE QCI 4 data bearer, LTE communication network 101 would enable the LTE CA for UE 102 to provide an increased bandwidth and bitrate and allow LTE UE 102 to transmit a greater amount of data over a shorter period of time.

In some examples, the LTE QCI 5 data bearer comprises a Session Initiation Protocol (SIP) signaling bearer. In some examples, LTE communication network comprises an LTE eNodeB.

FIG. 2 is a flow diagram illustrating an operation of LTE communication system 100 to control LTE CA for UE. LTE communication network 101 wirelessly exchanges (201) first data with UE 102 using the LTE CA to support at least an LTE QCI 5 data bearer. LTE communication network 101 detects (202) if UE accepts an LTE QCI 1 data bearer while the LTE CA and the LTE QCI 5 data bearer are active. In response, LTE communication network 101 disables (202) the LTE CA for UE 102. LTE communication network 101 wirelessly exchanges (203) second data with UE 102 over the LTE QCI 1 data bearer without using the LTE CA in response to the disablement.

FIG. 3 illustrates the operation of LTE communication system 100 to control LTE CA for UE. LTE network transceiver 110 wirelessly exchanges first data with UE 102 using the LTE CA to support at least an LTE QCI 5 data bearer. LTE network data processor 112 detects if UE 102 accepts an LTE QCI 1 data bearer while the LTE CA and the LTE QCI 5 data bearer are active. LTE network data processor 112 disables the LTE CA for UE 102. LTE network transceiver 110 wirelessly exchanges second data with UE 102 over the LTE QCI 1 data bearer without using the LTE CA in response to the disablement.

Figure 4:
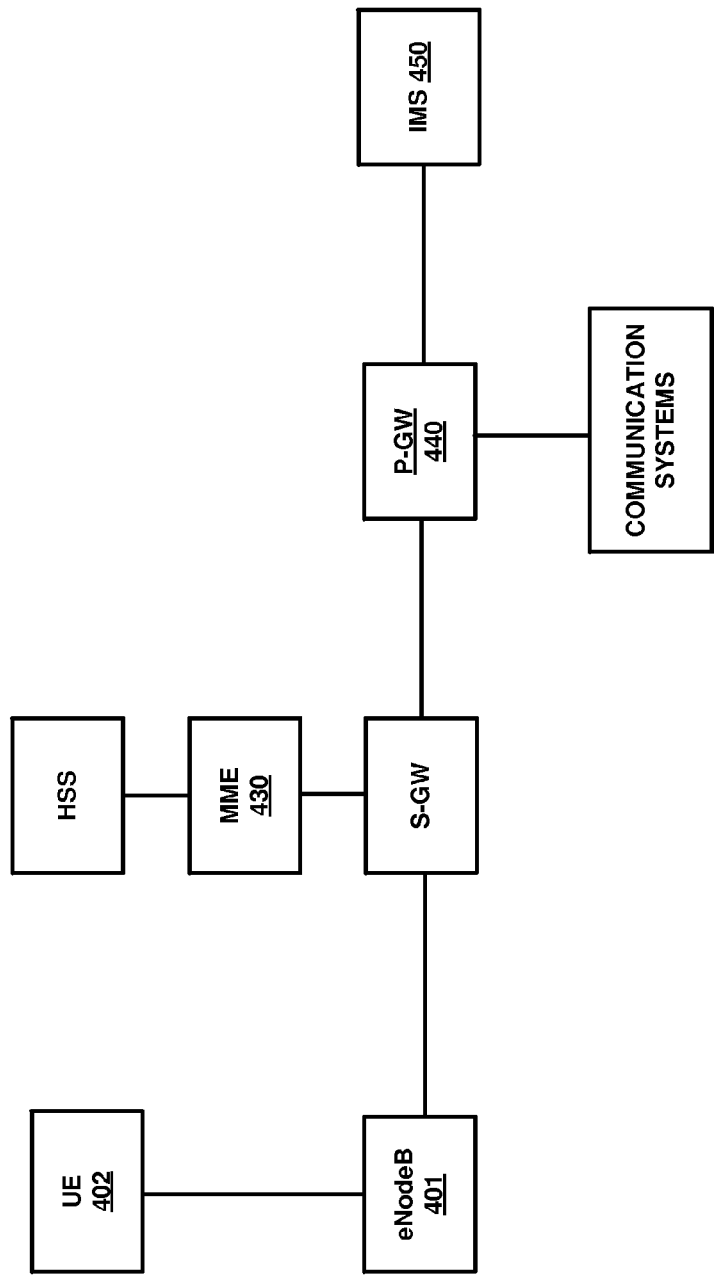
FIGS. 4-5 illustrate an evolved NodeB (eNodeB) to control LTE CA for UE.

FIG. 4 illustrates LTE communication system 400 to control LTE CA for UE. LTE communication system 400 is an example of communication system 100, although communication system 100 may use alternative configurations and operations. LTE communication system 400 includes UE 402, eNodeB 401, HSS, MME 430, S-GW, P-GW 440, IMS 450, and external communication systems. IMS delivers IP multimedia services for UE 402 between the LTE network and external communication systems using IP signaling, such as Session Initiation Protocol (SIP). SIP is a popular form of signaling to control the exchange of IP packets between communication devices for media streaming and other data transfer services.

Figure 5:
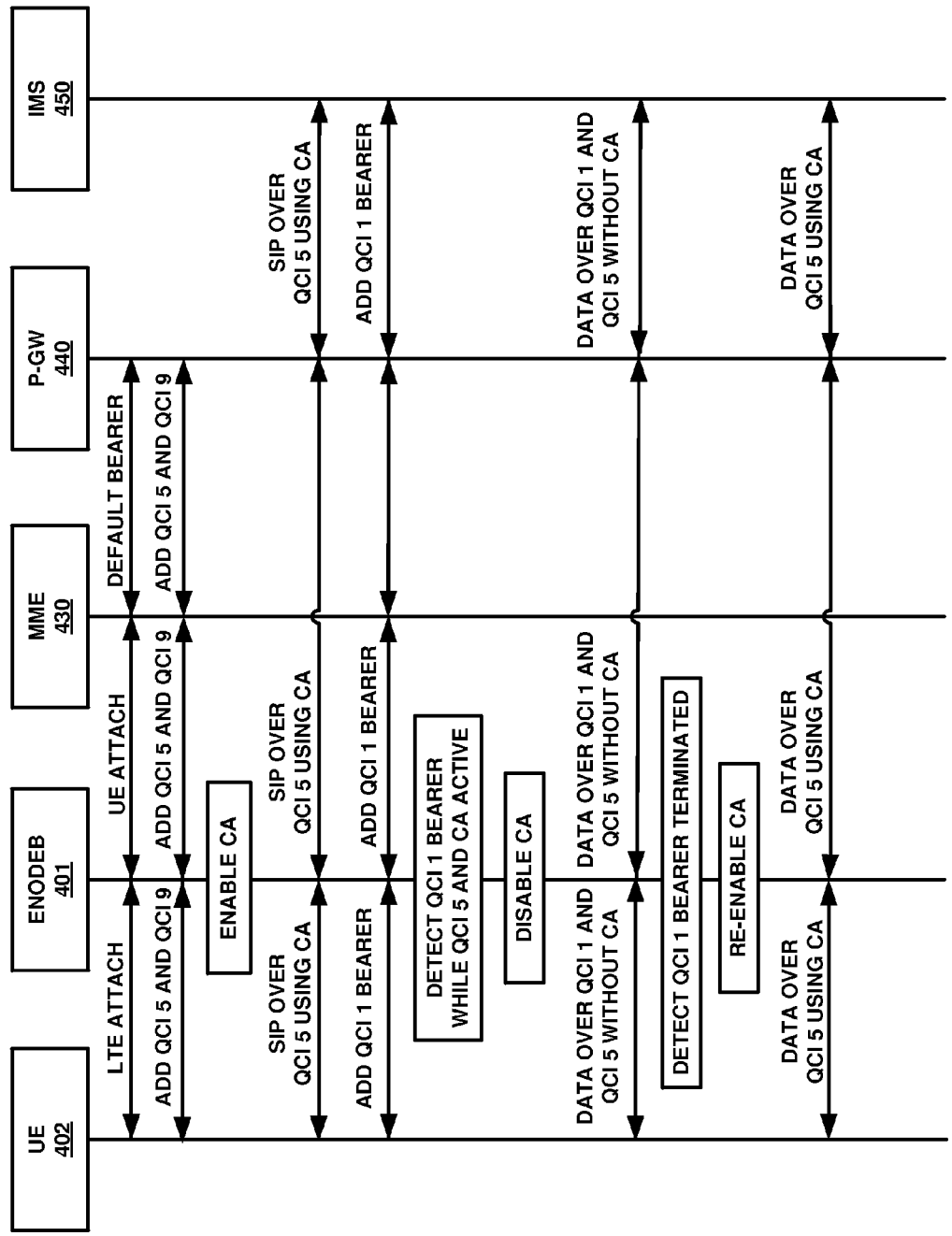

FIG. 5 illustrates an operation of LTE communication system 400 to control LTE CA for UE. UE 402 first attaches to the LTE Network by detecting eNodeB 401 and responsively exchanging RRC signaling with eNodeB 401. UE 402 then attaches to MME 430 by eNodeB 401 transferring an S1-Application Protocol (S1-AP) message to MME 430. In particular, MME 430 accesses the HSS to obtain the Access Point Name (APN) and associated APN information for UE 402. MME 430 typically processes the APN to select P-GW 440 and identify the Packet Data Network (PDN) type, default QCI, default Aggregate Maximum Bit Rate (AMBR), and other associated APN information.

In response, P-GW 440 transfers a Diameter request to a Policy Charging Rules Function (PCRF) indicating the APN, default QCI, and default AMBR, and the PCRF would then apply QoS and accounting rules for UE 402. UE 402, eNodeB 401, and MME 430 then exchange additional messaging to set context for the media communication session. MME 430 then transfers modify bearer signaling to P-GW 440 and UE 402 may then exchange user data over eNodeB 401 and P-GW 440.

MME 430 would then transfer a create session request to P-GW 440 requesting a default data bearer. P-GW 440 transfers a request to add a QCI 5 data bearer and a QCI 9 data bearer over eNodeB 401 which UE 402 accepts. The QCI 5 data bearer is typically used for IMS signaling and QCI 9 data bearer is typically used to establish an internet connection.

eNodeB 401 then enables LTE CA for UE 402. In particular, eNodeB 401 may enable LTE CA for UE 402 based on the type of UE 402, location of UE 402, IMSI, time of day, QCI, APN, or some other LTE CA related indication. eNodeB 401 enables LTE CA for UE 402 by scheduling the resource blocks in the channel timeslots and alerting UE 402 to open up its bandwidth to receive a larger signaling channel based on the scheduling grants.

Still referring to FIG. 5, eNodeB 401 transfers SIP registration information from UE 402 to IMS 450 via P-GW 440 over QCI data bearer 5 and QCI data bearer 9. eNodeB 401 and IMS 450 then exchange SIP invite information via P-GW 440 over QCI data bearer 5 and QCI data bearer 9 to set up a conversational voice bearer between UE 402 and external networks, user devices, and systems. In response to an invite message, IMS 450 directs P-GW 440 to add a QCI 1 data bearer. eNodeB 401 then wirelessly exchanges data with UE 402 from external systems via P-GW 440 using LTE CA to support SIP signaling bearer.

In response to UE 402 adding the QCI 1 data bearer, eNodeB 401 detects that UE 402 accepts QCI 1 bearer while LTE CA and QCI 5 data bearer are active. eNodeB 401 may detect if UE 402 accepts the LTE QCI 1 data bearer by eNodeB 401 receiving an RRC signaling message from UE 402 indicating that UE 402 accepted an add bearer request from the LTE network, or based on an order from MME 430 requesting eNodeB 401 to send an RRC signal message to UE 402 requesting UE 402 to add the bearer.

eNodeB 401 then disables LTE CA for UE 402 in response to the disablement. eNodeB 401 may disable the LTE CA for UE 402 by eNodeB 401 scheduling fewer resource blocks for the channel timeslots and instructing UE 402 to narrow its bandwidth for signaling based on the new scheduling grants. eNodeB 401 then wirelessly exchanges data with UE 402 from external systems via P-GW 440 over the LTE QCI 1 data bearer and QCI 5 data bearer without using LTE CA in response to the disablement.

Still referring to FIG. 5, eNodeB 401 detects LTE QCI 1 data bearer is terminated. In particular, eNodeB 401 may detect that LTE QCI 1 data bearer has been terminated by eNodeB 401 detecting a loss of use of the LTE QCI 1 data bearer over a predetermined period of time or receiving a communication from MME 430 that LTE QCI 1 data bearer has been torn down.

In response to detecting termination of the LTE QCI 1 data bearer, eNodeB 401 re-enables LTE CA for UE 402. eNodeB 401 typically would re-enable LTE CA by scheduling channel resource blocks for UE 402 and alerting UE 402 to open up its bandwidth for receiving signaling. eNodeB 401 then wirelessly exchanges data with UE 402 from external systems via P-GW 440 over the QCI 5 data bearer using LTE CA in response to the re-enablement.

Figure 6:
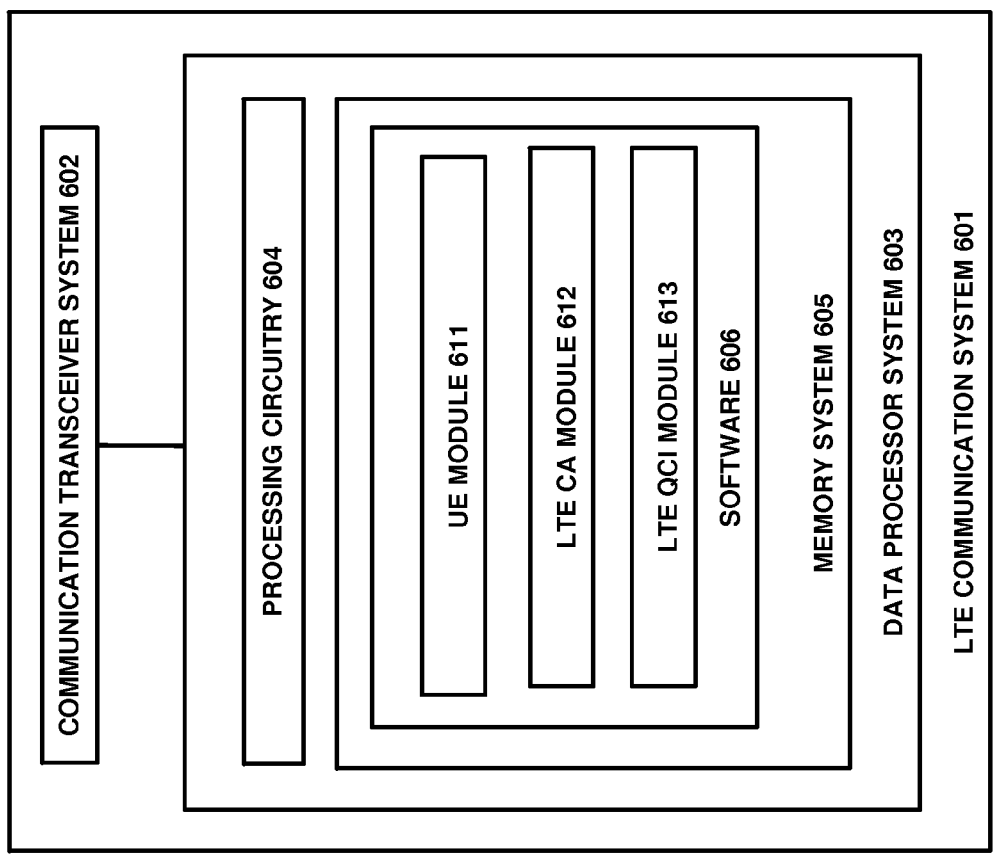
FIG. 6 illustrates an LTE communication system to control LTE CA for UE.

FIG. 6 illustrates LTE communication system 601 to control LTE CA for UE. LTE communication system 601 is an example of LTE communication system 100 and LTE communication system 400, although these systems may use alternative configurations and operations. LTE communication system 601 comprises communication transceiver system 602 and data processor system 603. Data processor system 603 includes processing circuitry 604 and memory system 605 that stores software 606. Software 606 comprises software modules 611-613.

Communication transceiver system 602 comprises components that communicate over communication links such as network cards, ports, RF transceivers, processing circuitry and software, or some other communication components. Communication transceiver system 602 may be configured to use LTE CA to allow UEs to use multiple signaling channels simultaneously. Communication transceiver system 602 may also be configured to use TDM, IP, Ethernet, optical networking, wireless protocols, communication signaling, or some other communication format—including combinations thereof. In particular, communication transceiver system 602 may interface with one of more LTE and non-LTE communication networks, IMS, and LTE control systems to transfer data and messages for a user communication device.

Processor circuitry 604 comprises microprocessor and other circuitry that retrieves and executes operating software 606 from memory system 605. Processor circuitry 604 may comprise a single device or could be distributed across multiple devices—including devices in different geographic areas. Processor circuitry 604 may be embedded in various types of equipment. Examples of processor circuitry 604 include central processing units, application specific processors, logic devices, and/or any type of computer processing devices—including combinations thereof. When executed by processing circuitry 604, software 606 directs data processor system 603 to operate LTE communication system 601 as described herein.

Memory system 605 comprises a non-transitory computer readable storage medium readable by processing system 604 and capable of storing software 606, such as a disk drive, flash drive, data storage circuitry, or some other hardware memory apparatus—including combinations thereof. Memory system 605 can include volatile and non-volatile, removable and non-removable media implemented in any method or technology for storage of information, such as computer readable instructions, data structures, program modules, or other data—including combinations thereof. Memory system 605 may comprise a single device or could be distributed across multiple devices—including devices in different geographic areas. Memory system 605 may be embedded in various types of equipment. In some examples, a computer apparatus could comprise memory system 605 and software 606.

Software 606 may be implemented in program instructions and may be executed by data processor system 603. Software 606 comprises computer programs, firmware, or some other form of machine-readable processing instructions. Software 606 may include an operating system, utilities, drivers, network interfaces, applications, or some other type of software. In this example, software 606 comprises UE interface module 611, LTE CA module 612, and QCI data bearer module 613, although software 606 could have alternative configurations in other examples. When executed by processing circuitry 604, software 606 directs data processor system 603 to operate as described herein.

In particular, when executed by processing circuitry 604, UE module 611 directs data processor system 603 to wirelessly exchange first data with the UE using the LTE CA to support at least the LTE QCI 5 data bearer. When executed by processing circuitry 604, UE module 611 also directs data processor system 603 to wirelessly exchange second data with the UE over the LTE QCI 1 data bearer without using the LTE CA in response to the LTE CA disablement. When executed by processing circuitry 604, LTE CA module 612 directs data processor system 603 to disable the LTE CA for the UE. When executed by processing circuitry 604, LTE QCI module 613 directs data processor system 603 to detect if the UE accepts an LTE QCI 1 data bearer while the LTE CA and the LTE QCI 5 data bearer are active.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) evolved NodeB (eNodeB) to control LTE Carrier Aggregation (CA) for LTE User Equipment (UE), the method comprising:
   wirelessly exchanging first data with the LTE UE using the LTE CA to support at least an LTE Quality-of-Service Class Identifier 5 (QCI 5) data bearer for Internet Protocol Multimedia Session (IMS) signaling;
   detecting if the LTE UE accepts at least one of an LTE QCI 1 data bearer for conversational voice call services and an LTE QCI 2 data bearer for conversational video services while the LTE CA and the LTE QCI 5 data bearer are active, and in response, disabling the LTE CA for the LTE UE; and
   wirelessly exchanging second data with the LTE UE over the LTE QCI 5 data bearer and the at least one of the LTE QCI 1 data bearer and the LTE QCI 2 data bearer without using the LTE CA in response to the disablement.

2. The method of claim 1 further comprising:
   detecting if the LTE QCI 1 data bearer is terminated, and in response, re-enabling the LTE CA for the LTE UE; and
   wirelessly exchanging third data with the LTE UE using the LTE CA in response to the re-enablement.

3. The method of claim 1 further comprising:
   detecting if the LTE QCI 2 data bearer is terminated, and in response, re-enabling the LTE CA for the LTE UE; and
   wirelessly exchanging fourth data with the LTE UE using the CA in response to the re-enablement.

4. The method of claim 1 further comprising:
   detecting if the LTE UE accepts an LTE QCI 3 data bearer for real time gaming services while the LTE CA and the LTE QCI 5 data bearer are active, and in response, disabling the LTE CA for the LTE UE; and
   wirelessly exchanging third data with the LTE UE over the LTE QCI 5 data bearer and the LTE QCI 3 data bearer without using the LTE CA in response to the disablement.

5. The method of claim 4 further comprising:
   detecting if the LTE QCI 3 data bearer is terminated, and in response, re-enabling the LTE CA for the LTE UE; and
   wirelessly exchanging fourth data with the LTE UE using the LTE CA in response to the re-enablement.

6. The method of claim 1 further comprising:
   detecting if the LTE UE accepts an LTE QCI 4 data bearer for non-conversational video services while the LTE CA and the LTE QCI 5 data bearer are active, and in response, disabling the LTE CA for the LTE UE; and wirelessly exchanging third data with the LTE UE over the LTE QCI 5 data bearer and the LTE QCI 4 data bearer without using the LTE CA in response to the disablement.

7. The method of claim 6 further comprising:
detecting if the LTE QCI 4 data bearer is terminated, and in response, re-enabling the LTE CA for the LTE UE; and
wirelessly exchanging fourth data with the LTE UE using the LTE CA in response to the re-enablement.

8. The method of claim 1 wherein the LTE QCI 5 data bearer comprises a Session Initiation Protocol (SIP) signaling bearer.

9. A Long Term Evolution (LTE) evolved NodeB (eNodeB) to control LTE Carrier Aggregation (CA) for LTE User Equipment (UE), the LTE communication network comprising:
a wireless transceiver configured to wirelessly exchange first data with the LTE UE using the LTE CA to support at least an LTE Quality-of-Service Class Identifier 5 (QCI 5) data bearer for Internet Protocol Multimedia Session (IMS) signaling;
a data processor configured to detect if the LTE UE accepts at least one of an LTE QCI 1 data bearer for conversational voice call services and an LTE QCI 2 data bearer for conversational video services while the LTE CA and the LTE QCI 5 data bearer are active, and in response, to disable the LTE CA for the LTE UE; and
the wireless transceiver configured to wirelessly exchange second data with the LTE UE over the LTE QCI 5 data bearer and the at least one of the LTE QCI 1 data bearer and the LTE QCI 2 data bearer without using the LTE CA in response to the disablement.

10. The LTE evolved NodeB (eNodeB) of claim 9 further comprising:
the data processor configured to detect if the LTE QCI 1 data bearer is terminated, and in response, to re-enable the LTE CA for the LTE UE; and
the wireless transceiver configured to wirelessly exchange third data with the LTE UE using the LTE CA in response to the enablement.

11. The LTE evolved NodeB (eNodeB) of claim 9 further comprising:
the data processor configured to detect if the LTE QCI 2 data bearer is terminated, and in response, to re-enable the LTE CA for the LTE UE; and the wireless transceiver configured to wirelessly exchange fourth data with the LTE UE using the LTE CA in response to the re-enablement.

12. The LTE evolved NodeB (eNodeB) of claim 9 further comprising:
the data processor configured to detect if the LTE UE accepts an LTE QCI 3 data bearer for real time gaming services while the LTE CA and the LTE QCI 5 data bearer are active, and in response, to disable the LTE CA for the LTE UE; and
the wireless transceiver configured to wirelessly exchange third data with the LTE UE over the LTE QCI 5 data bearer and the LTE QCI 3 data bearer without using the LTE CA in response to the disablement.

13. The LTE evolved NodeB (eNodeB) of claim 12 further comprising:
the data processor configured to detect if the LTE QCI 3 data bearer is terminated, and in response, to re-enable the LTE CA for the LTE UE; and
the wireless transceiver configured to wirelessly exchange fourth data with the LTE UE using the LTE CA in response to the re-enablement.

14. The LTE evolved NodeB (eNodeB) of claim 9 further comprising:
the data processor configured to detect if the LTE UE accepts an LTE QCI 4 data bearer for non-conversational video services while the LTE CA and the LTE QCI 5 data bearer are active, and in response, to disable the LTE CA for the LTE UE; and
the wireless transceiver configured to wirelessly exchange third data with the LTE UE over the LTE QCI 5 data bearer and the LTE QCI 4 data bearer without using the LTE CA in response to the disablement.

15. The LTE evolved NodeB (eNodeB) of claim 14 further comprising:
the data processor configured to detect if the LTE QCI 4 data bearer is terminated, and in response, to re-enable the LTE CA for the LTE UE; and
the wireless transceiver configured to wirelessly exchange fourth data with the LTE UE using the LTE CA in response to the re-enablement.

16. The LTE evolved NodeB (eNodeB) of claim 9 wherein the LTE QCI 5 data bearer comprises a Session Initiation Protocol (SIP) signaling bearer.

* * * * *